US012162176B2

(12) United States Patent
Hansen et al.

(10) Patent No.: US 12,162,176 B2
(45) **Date of Patent: *Dec. 10, 2024**

(54) UTILITY KNIFE

(71) Applicant: STANLEY BLACK & DECKER, INC., New Britain, CT (US)

(72) Inventors: Frederick S. Hansen, Cheraw, SC (US); David A. Webb, Cheraw, SC (US); Stephen Rowlay, Sheffield (GB)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,352

(22) Filed: Feb. 6, 2023

(65) Prior Publication Data

US 2023/0182331 A1 Jun. 15, 2023

Related U.S. Application Data

(63) Continuation of application No. 16/276,721, filed on Feb. 15, 2019, now Pat. No. 11,571,824, which is a continuation of application No. 12/716,579, filed on Mar. 3, 2010, now abandoned.

(60) Provisional application No. 61/157,523, filed on Mar. 4, 2009.

(51) Int. Cl.
*B26B 5/00* (2006.01)
*B26B 1/04* (2006.01)
*B26B 9/00* (2006.01)

(52) U.S. Cl.
CPC .............. *B26B 5/001* (2013.01); *B26B 1/046* (2013.01); *B26B 9/00* (2013.01)

(58) Field of Classification Search
CPC B26B 5/001; B26B 10/46; B26B 9/00; B26B 1/046
See application file for complete search history.

(56) References Cited

U.S. PATENT DOCUMENTS 1,454,443 A * 5/1923 Norbert .................... B26B 11/00 30/162
1,484,538 A * 2/1924 Wetmore ................ B26B 5/006 30/156
1,782,901 A * 11/1930 Kassel .................... B26B 5/006 30/330
1,843,970 A * 2/1932 Bodkin ................... B26B 5/006 30/162
2,037,914 A * 4/1936 McCullough ........... B26B 5/006 30/156

(Continued)

*Primary Examiner* — Ghassem Alie
*Assistant Examiner* — Samuel A Davies
(74) *Attorney, Agent, or Firm* — Gabriel A. Haboubi

(57) ABSTRACT

A utility knife includes a handle base and a neck connected to the handle base for pivotal movement relative to the handle base between a closed position and an open position. The knife also includes a utility blade holder slidingly carried by the neck for sliding movement relative to the neck between a retracted position and an extended position. A utility blade is carried by the blade holder such that movement of the utility blade holder between its extended and retracted positions moves the utility blade between an exposed position in which a cutting edge of the blade is exposed, and a protected position in which the cutting edge of the blade is protected by the neck.

16 Claims, 9 Drawing Sheets

(56) References Cited

U.S. PATENT DOCUMENTS

| | | | | | |
|---|---|---|---|---|---|
| 2,094,260 | A * | 9/1937 | Brody | B26B 5/006 | 30/162 |
| 2,523,575 | A * | 9/1950 | Kassel | B26B 5/006 | 30/156 |
| 2,631,368 | A * | 3/1953 | Baukus | B43M 7/002 | 359/809 |
| 3,171,201 | A * | 3/1965 | Carifi | B26B 5/006 | 30/162 |
| 4,017,969 | A * | 4/1977 | Stonebraker | B26B 1/04 | 30/40 |
| 5,023,996 | A * | 6/1991 | Pape | B25F 1/04 | 7/150 |
| 6,253,455 | B1 * | 7/2001 | Eriksson | B23D 51/01 | 30/155 |
| 6,948,409 | B2 * | 9/2005 | Ackeret | B26B 11/008 | 7/128 |
| D527,241 | S * | 8/2006 | Davis | D3/220 | |
| D540,138 | S * | 4/2007 | Kan | D8/99 | |
| 7,810,415 | B2 * | 10/2010 | Adamany | B25B 27/0071 | 7/168 |
| 9,108,323 | B2 * | 8/2015 | Billado, Jr. | B26B 5/001 | |
| 2005/0050734 | A1 * | 3/2005 | Kesinger | B26B 5/002 | 30/162 |
| 2006/0026844 | A1 * | 2/2006 | Ping | B26B 1/046 | 30/162 |
| 2008/0289190 | A1 * | 11/2008 | Jennings | B26B 1/02 | 30/155 |

* cited by examiner

UTILITY KNIFE

CROSS REFERENCE

This application is a continuation of U.S. patent application Ser. No. 16/276,721, filed Feb. 15, 2019 and issued as U.S. Pat. No. 11,571,824, which is a continuation of U.S. patent application Ser. No. 12/716,579, filed Mar. 3, 2010, which claims the benefit of priority from U.S. Provisional Patent Application Ser. No. 61/157,523, filed Mar. 4, 2009, titled "UTILITY KNIFE." The entire contents of each of the above-mentioned applications are hereby incorporated by reference herein in their entireties.

BACKGROUND OF THE INVENTION

1. Field of the Invention

This invention relates to utility knives that can selectively expose or protect a cutting edge of a replaceable blade.

2. Description of Related Art

A conventional utility knife includes a long handle with a blade holder slidably disposed within the handle. See, e.g., U.S. Pat. Nos. 4,242,795, 6,249,975. A utility blade detachably mounts to the blade holder. The standard blade has a cutting edge disposed on one edge and one or more mounting notches disposed on an opposite edge. When the blade holder is in a retracted position, the blade is disposed within and protected by the handle. When the blade holder is slid into an extended position, a portion of the blade becomes exposed for use.

The conventional handle is relatively long so as to provide enough longitudinal space/support for a user's hand to apply sufficient leverage to the blade during a cutting action, and/or to enable the user to grip the handle without being overly close to the blade's cutting edge. Unfortunately, the length and size of this handle makes the utility knife large and cumbersome when the knife is not being used.

SUMMARY OF EMBODIMENTS OF THE INVENTION

One of more embodiments of the present invention provide a compact utility knife with a various combinations of features, including one or more of the following features: a pivotally-folding handle; a neck lock for selectively locking the pivotally folding handle in closed and opened positions; a handle with a closed length of less than 5.5, 5, 4.5, 4.25, 4, 3.75, 3.5, 3.25, or 3 inches; a handle with an open length of greater than 3.5, 4, 4.5, 5, 5.5, or 6 inches; a handle with a ratio of its open length to its closed length of at least 1.15, 1.2, 1.25, 1.3, 1.35, 1.4, 1.45, 1.5, 1.55, 1.6, 1.65, or 1.7; a blade holder that slides relative to the handle between retracted and one or more extended positions; a blade holder that may be retained in an extended position while the handle is folded into a closed position; a blade holder that may be retained in an extended position (e.g., partially extended, fully extended) with a utility blade extending therefrom while the handle is folded into a closed position; a blade holder slide lock; a blade holder slide lock having a control button disposed on the top edge of the open knife; a blade lock quick-release that selectively unlocks the blade from the blade holder without disassembly of the knife; and/or a retraction/closing synchronization mechanism that synchronizes opening and closing of the knife's handle with extension and retraction of the knife's blade and/or blade holder.

One of more embodiments of the present invention provide a knife that includes a handle base; a neck connected to the handle base for movement relative to the handle base between a closed position and an open position; a utility blade holder slidingly carried by the neck for sliding movement relative to the neck between a retracted position and an extended position; and a utility blade carried by the blade holder. Movement of the utility blade holder between its extended and retracted positions moves the utility blade between an exposed position in which a cutting edge of the blade is exposed, and a protected position in which the cutting edge of the blade is protected by the neck.

According to one or more of these embodiments, the neck pivotally connects to the handle base for pivotal movement relative to the handle base between the closed position and the open position.

According to one or more of these embodiments, the blade holder is movable between its extended and retracted position while the neck is in its open position.

According to one or more of these embodiments, the knife also includes a manually operable slide lock that selectively locks the blade holder in the extended or retracted position.

According to one or more of these embodiments, the knife also includes a manually operable neck lock that selectively locks the neck in either of the open and closed positions.

According to one or more of these embodiments, the neck is movable into the closed position while the blade holder is in the extended position and the blade is in the exposed position.

According to one or more of these embodiments, the utility blade has a mounting notch formed in a first linear edge and a cutting edge opposite the first linear edge. The utility blade may substantially have the shape of an isosceles trapezoid, the cutting edge being disposed on a longest edge of the trapezoid.

According to one or more of these embodiments, the handle base and neck together define a handle of the knife, and the handle is longer when the neck is in the open position than in the closed position.

According to one or more of these embodiments, a combined length of the handle base and neck when the neck is in the closed position is less than 4.5 inches.

According to one or more of these embodiments, a combined length of the handle base and neck when the neck is in the closed position is less than 5 inches; and a combined length of the handle base and neck when the neck is in the open position is at least 25% longer than the combined length of the handle base and neck when the neck is in the closed position.

One of more embodiments of the present invention provide a knife that includes a handle base; a neck connected to the handle base for movement relative to the handle base between a closed position and an open position; and a utility blade holder slidingly carried by the neck for sliding movement relative to the neck between an extended position and a retracted position. The utility blade holder is shaped and configured to have a utility blade carried by the blade holder such that movement of the utility blade holder between its extended and retracted positions moves the utility blade between an exposed position in which a cutting edge of the blade is exposed, and a protected position in which the cutting edge of the blade is protected by the neck.

According to one or more of these embodiments, the handle base and neck together define a handle of the knife;

a closed length of the handle when the neck is in the closed position is less than 5 inches; and an open length of the handle when the neck is in the open position is at least 25% longer than the closed length.

One of more embodiments of the present invention provide a knife that includes a handle base; a neck pivotally connected to the handle base for pivotal movement relative to the handle base between a closed position and an open position; a utility blade holder slidingly carried by the neck for sliding movement relative to the neck from a retracted position to an extended position; and a utility blade carried by the blade holder. Movement of the utility blade holder from the retracted position to the extended position moves the utility blade from a protected position in which a cutting edge of the blade is protected by the neck to an exposed position in which the cutting edge is exposed.

According to one or more of these embodiments, the utility blade holder is slidingly carried by the neck for sliding movement relative to the neck between the extended and retracted positions; and movement of the utility blade holder from its extended position to its retracted position moves the utility blade from its exposed position to its protected position.

These and other aspects of various embodiments of the present invention, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification, the singular form of “a”, “an”, and “the” include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
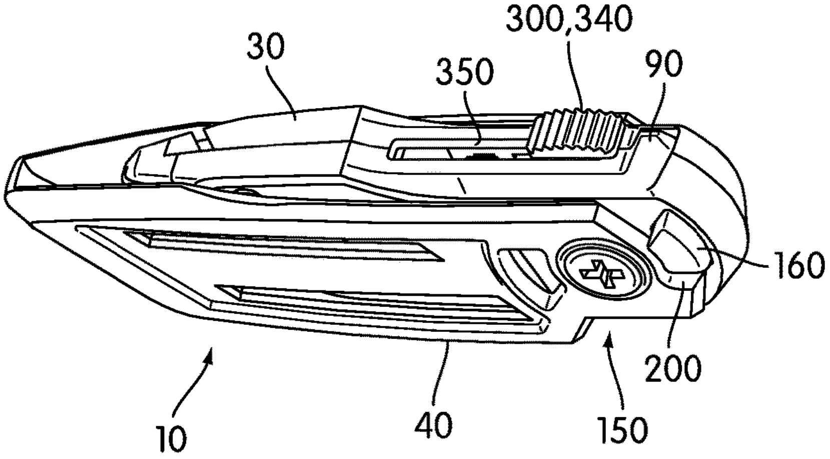
FIG. 1 is a perspective view of a top, left side of a utility knife according to an embodiment of the present invention, with the knife in a closed position.

FIGS. 1-12 illustrate a utility knife 10 according to an embodiment of the present invention. The knife 10 includes a handle 20, a neck 30, a handle base 40, a neck lock 150, a sliding blade holder 200, a slide lock 300, and a blade-lock quick-release 400.

Figure 11:
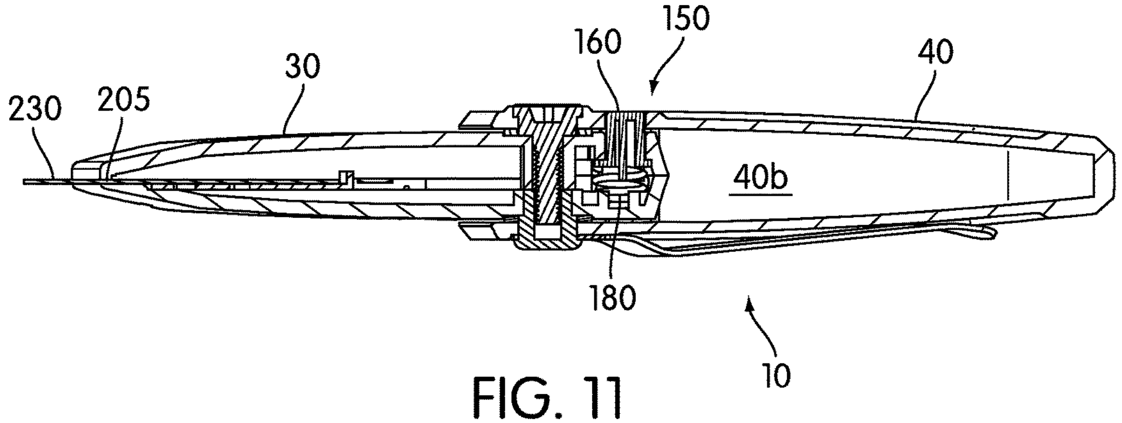
FIG. 11 is a cross-sectional view thereof.
Figure 12:
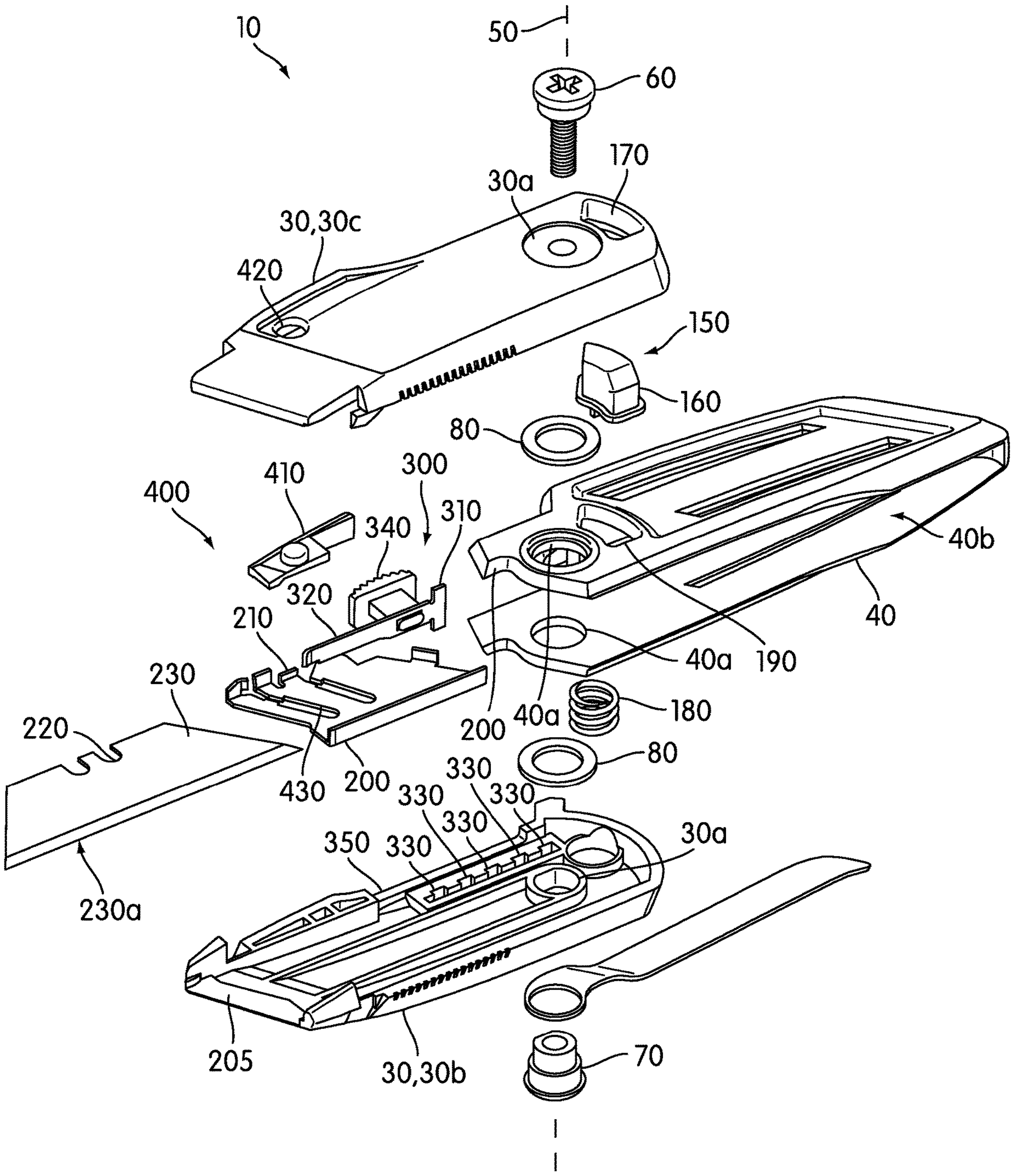
FIG. 12 is an exploded perspective view of the knife of FIG. 1.

As shown in FIG. 12, the neck 30 pivotally connects to the handle base 40 for relative pivotal movement about an axis 50 by a bolt 60, nut 70, and washers 80. The bolt 60 extends through holes 30*a*, 40*a* in the neck 30 and handle base 40, respectively. The handle base 40 has a hollow channel 40*b* that is open on its lower side (as viewed when the knife is in the open position shown in FIG. 4) such that the neck 30 can pivot about the axis 50 into and out of the hollow channel of the handle base 40. Consequently, the neck 30 pivots relative to the handle base 40 between an open position (shown in FIGS. 2, 4, 7, 8, 10, and 11) and a closed position (shown in FIGS. 1, 3, 5, 6, and 9). When the neck 30 is in the closed position, a majority of the neck 30 is disposed within the channel of the handle base 40.

In the illustrated embodiment, the neck 30 and handle base 40 together form the handle 20 such that the handle 20 is long and comfortable for a user to grip when the neck 30 is in the open position, and a compact and easily storable when the neck 30 is in the closed position. However, according to alternative embodiments of the present invention, the handle base 40 alone defines the handle, and the neck 30 projects from the handle 20/handle base 40 without being part of the handle 20.

While the illustrated embodiment utilizes a bolt/nut fastener, any other suitable pivotal connection could be used instead without deviating from the scope of the present invention.

While the illustrated embodiment utilizes a pivotal connection between the handle base 40 and neck 30, the connection may alternatively be any other type of suitable movable connection (e.g., linear or curved telescopic/sliding connection between the handle base 40 and neck 30) without deviating from the scope of the present invention.

Figure 7:
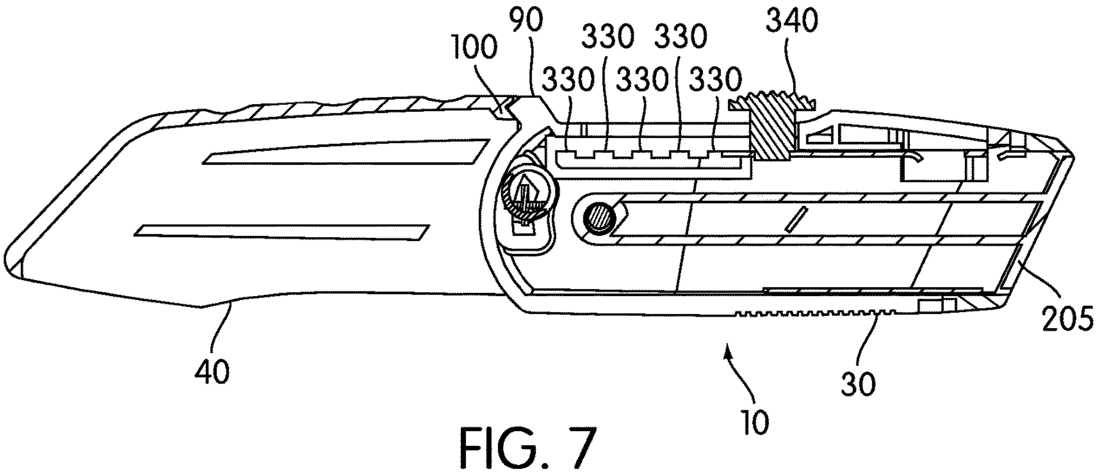
FIG. 7 is a cross-sectional side view of a right side of the knife of FIG. 1 in the open position.
Figure 10:
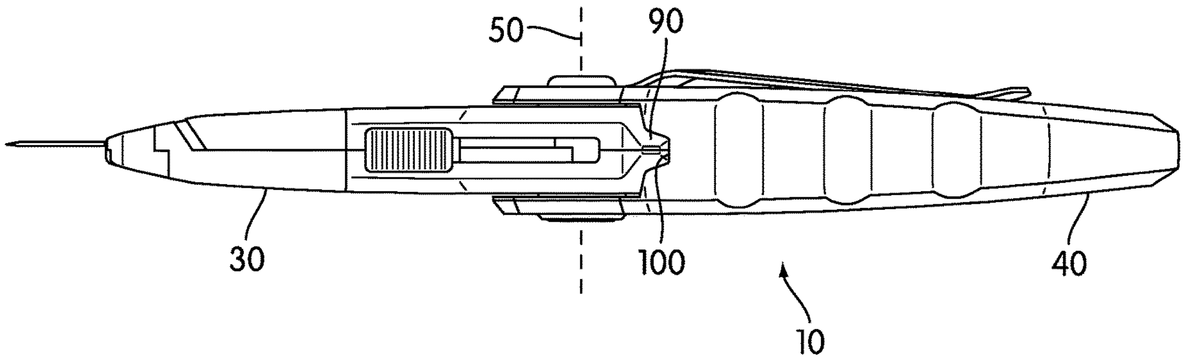
FIG. 10 is a top view of the knife of FIG. 1 in the open position.

As best illustrated in FIGS. 7 and 10, a protrusion 90 on the neck 30 abuts a notch 100 on the handle base 40 to prevent the neck 30 and handle base 40 from pivoting beyond their open position.

In the illustrated embodiment, when the neck 30 and handle base 40 are in their open position, they generally extend linearly relative to each other to maximize an open length of the handle 20. However, according to alternative embodiments of the present invention, the neck 30 and handle base 40 may define an arc (e.g., "(" shape) or angle (e.g., ">" shape) when opened into their open position.

Figure 2:
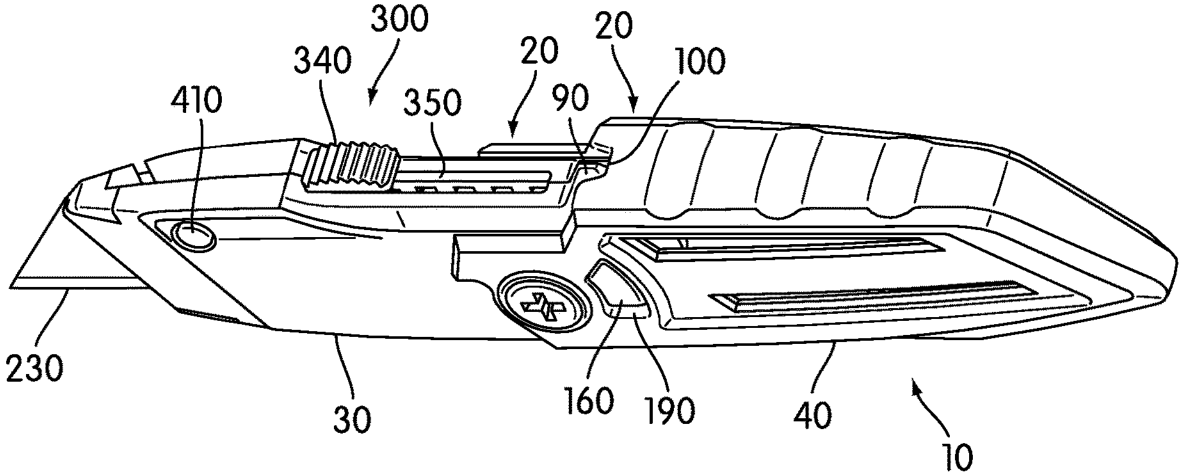
FIG. 2 is a perspective view of a top, left side of the knife of FIG. 1 in an open position.

As shown in FIG. 12, the knife 10 also includes a neck lock 150 that selectively locks the handle 20 in either of the open and/or closed positions. As shown in FIG. 12, the neck lock 150 includes a button 160 that laterally extends out through a hole 170 in the neck 30. As shown in FIGS. 11 and 12, the button 160 is biased outwardly by a compression spring 180 that extends between the neck 30 and the button 160. A shoulder on the button 160 is larger than the hole 170 and prevents the button 160 from extending entirely through the hole 170 and detaching from the neck 30. The handle base 40 includes a lock-open surface 190 (see FIGS. 2 and 12) and a lock-closed surface 200 (see FIGS. 1 and 12). As shown in FIG. 1, when the neck 30 and handle base 40 are in their closed position, and the button 160 is allowed to move to its outward, locked position, the button 160 abuts the lock-closed surface 200 to prevent the neck 30 and handle base 40 from moving out of their closed position. To open the handle 20, a user manually depresses the button 160 sufficiently to allow an interior surface of the handle base 40 to slide over the button 160 as the handle 20 opens. The interior surface prevents the button 160 from moving outwardly until the handle 20 reaches its open position, at which point the button 160 moves outwardly under the bias of the spring 180. As shown in FIG. 2, once the handle 20 is in the open position, the button 160 abuts the lock-open surface 190 to prevent the neck 30 and handle base 40 from moving out of their open position. To close the handle 20, a user depresses the button 160 and closes the handle 20.

While the illustrated neck lock 150 utilizes a button 160 and lock surfaces, any other suitable type of neck lock could be used without deviating from the scope of the present invention (e.g., the type of locking devices conventionally used with lock-blade sporting knives).

While the illustrated neck lock 150 includes both lock-open and lock-closed positions, a neck lock according to alternative embodiments of the present invention includes just one of the lock positions (e.g., just a lock-open position or just a lock-closed position).

Figure 6:
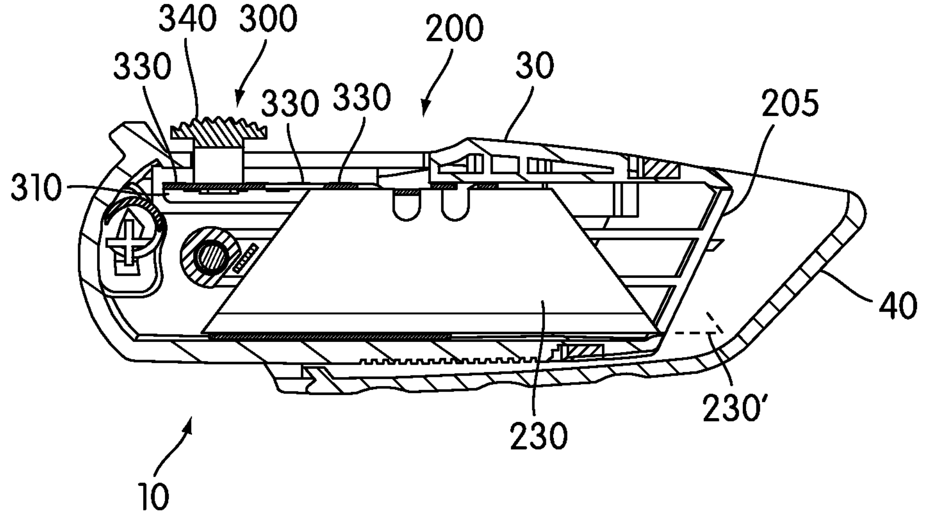
FIG. 6 is a cross-sectional view thereof.
Figure 8:
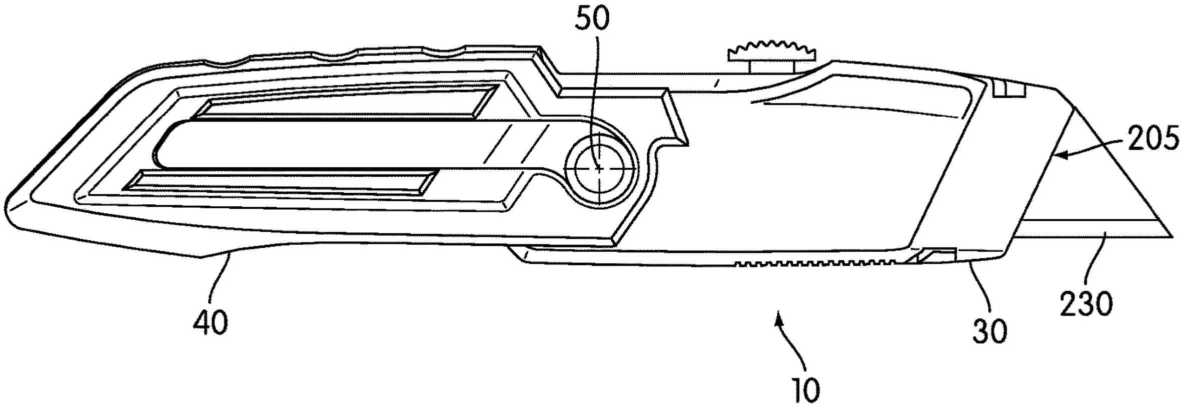
FIG. 8 is a side view of a right side of the knife of FIG. 1 in the open position.
Figure 9:
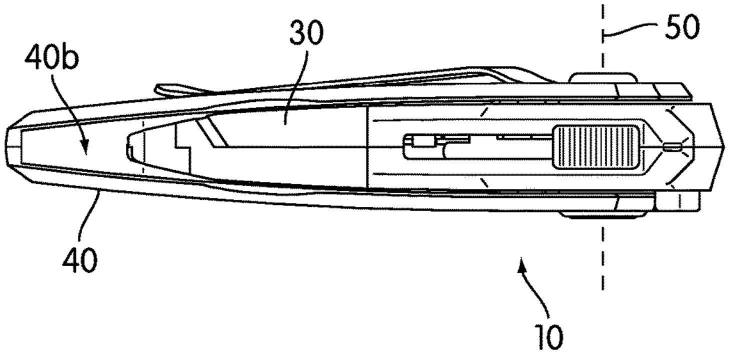
FIG. 9 is a top view of the knife of FIG. 1 in the closed position.

As shown in FIG. 12, the sliding blade holder 200 is slidably/telescopically carried by the neck 30 for movement relative to the neck 30 and the handle 20 between a retracted position (see FIGS. 1, 3, 5, 6, and 9) and one or more extended positions (see FIGS. 2, 4, 7, 8, 10, and 11). As shown in FIG. 6, when the blade holder 200 and blade 230 are in the retracted position, the trapezoidal utility blade 230 does not extend out of a blade aperture 205 in the front of the neck 30. In the retracted position, the cutting edge of the blade 230 is protected by the neck 30. Conversely, as shown in FIG. 8, when the blade holder 200 and blade 230 are in one of the extended positions, a portion of the blade 230 extends out of the aperture 205.

In the illustrated embodiment, the blade holder 200 slides/telescopes linearly relative to the neck 30 between its retracted and extended positions. Alternatively, the blade holder 200 may slide/telescope relative to the neck 30 along a simple or complex curved or curvilinear path without deviating from the scope of the present invention.

As shown in FIG. 12, the neck 30 comprises two halves **30*b*, 30*c* that fit together and are held together by the bolt 60 and nut 70. As shown in FIG. 12, the blade holder 200 slides along guide surfaces of the neck halves 30*b*, 30*c*. The blade holder 200 includes a detent/protrusion 210 that fits into a notch 220 of a standard trapezoidal utility blade 230 to help secure the blade 230 to the blade holder 200. When the blade 230 is mounted to the blade holder 200 and the neck halves 30*b*, 30*c* are assembled around the blade holder 200, the blade 230 is sandwiched between the blade holder 200 and the neck half 30*b* so as to lock the blade 230 to the knife 10**.

In the illustrated embodiment, when the handle 20 is in its open position and the blade 230 and blade holder are in an extended position, the handle base 40 projects away from the neck 30 in a direction that is substantially opposite to a direction that the blade 230 and blade holder 200 move when the blade 230 and blade holder 200 move from their retracted to extended positions.

As shown in FIG. 12, the knife 10 includes a slide lock 300 that selectively locks the blade holder 200 in its retracted or one or more extended positions. The slide lock 300 comprises a detent/protrusion 310 that connects to the blade holder 200 via a leaf spring 320 that upwardly biases the detent 310. As shown in FIGS. 6, 7, and 12, the leaf spring 320 biases the detent 310 toward and into one of a plurality of notches 330 in the neck 30. As shown in FIG. 6, when the detent 310 extends into the rearwardmost notch 330, the blade holder is locked in its retracted position. The remaining notches 330 correspond to increasingly extended locked positions, which expose the blade 230 to varying extents.

The slide lock 300 includes an actuator button 340 that extends upwardly from the spring 320 (see FIG. 12) and out of the neck 30 through a longitudinal slot 350 in the top of the neck 30 (see FIGS. 1, 2). To use the slide lock 300 and slide the blade holder 200 between its retracted and extended positions, the user depresses the button 340 downwardly to disengage the detent 310 from a notch 330. The user then longitudinally pushes or pulls the button 340 to slide the blade holder 200 into the desired extension/retraction position. The user then releases the button 340, which allows the spring 320 to bias the detent 310 back upwardly into the adjacent notch 330, which locks the blade holder 200 in the selected extension/retraction position.

While the illustrated embodiment utilizes a top-mounted button 340 for the slide lock 300, a side-mounted button according to an alternative embodiment of the present invention may be used without deviating from the scope of the present invention. Moreover, an alternative type of slide lock may be used without deviating from the scope of the present invention.

In the illustrated embodiment, the blade holder 200, leaf spring 320, and detent 310 are all integrally formed from a bent piece of sheet material (e.g., steel). However, these components may alternatively be separately formed without deviating from the scope of the present invention.

As shown in FIG. 12, the knife 10 includes a blade-lock quick-release 400. The quick-release comprises a button 410 that is disposed in the neck 30 and extends outwardly from the neck 30 through a hole 420 in the neck 30. A shoulder on the button 410 prevents the button 410 from extending through the hole 420 to an extent that the button 410 would fall out of the hole 420. The button 410 abuts an end of a leaf spring 430 defined by part of the blade holder 200. The spring 430 biases the button 410 laterally outwardly, as shown in FIG. 2. As shown in FIG. 12, the blade-locking detent 210 is also disposed on the end of the spring 430. To use the quick-release 400 to release the blade 230 from being locked to the knife 10, a user moves the blade holder 200 into its fully extended position and presses the button 420 laterally inwardly, which pushes the spring 430 laterally, which, in turn, laterally displaces the detent 210, thereby disengaging the detent 210 from the notch 220 in the blade 230. While the user keeps the button 410 depressed, the user can pull the blade 230 out of the aperture 205 in the neck 30 and replace the blade 230 with a new blade 230 or flip the blade 230 around to use the opposite end of the blade's cutting edge. When the blade 230 (or a new blade 230) is slid back into the aperture 205 of the neck 30, the user releases the button 410, which allows the spring 430 to push the button 410 and detent 210 back into their natural state, which engages the detent 210 with the notch 220 of the blade 230, thereby locking the blade 230 to the neck 30.

Although a specific type of quick release is illustrated, a variety of other types of quick-releases may be used without deviating from the scope of the present invention. For example, the halves 30*b*, 30*c* of the neck 30 could pivot relative to each other about the axis 50 between closed and open positions. A locking mechanism could selectively hold the neck halves 30*b*, 30*c* in their closed position. When in their open position, the blade 230 could be accessed from the side of the knife.

According to various embodiments of the present invention, the quick-release 400 may be omitted. For example, if omitted, the blade 230 could be accessed and replaced by disassembling the neck 30 by unscrewing the bolt 60, as is done in conventional two-half utility knives.

As shown in FIG. 6, when the handle 20 is in its closed position, the handle base 40 limits the extent to which the blade 230 and blade holder 200 can slide into extended positions and at least partially covers the aperture 205. In the illustrated embodiment, as shown by the dotted lines 230' in FIG. 6, the blade 230 and blade holder 200 can slide into a partially extended position while the handle 20 is closed. According to alternative embodiments of the present invention, the connection between the handle base 40 and neck 30 may provide sufficient clearance to allow the handle 20 to fold into its closed position even when the blade 230 and blade holder 200 are locked in their fully extended, operative positions (e.g., as shown in FIG. 8). Permitting the blade 230 to be partially and/or fully extended while the handle 20 is closed enables the user to keep the blade 230 in an extended position relative to the neck 30 while opening and closing the handle 20. When closed, the handle base 40 encloses the otherwise exposed portion of the blade 230 to ensure that the blade's cutting edge is protected and not exposed. Thus, the user can move the knife between a closed storage position and an open, ready-to-use position with the blade 230 exposed for use simply by opening and closing the handle 20. During such use, the user need not extend or retract the blade holder 200 to expose or protect the blade 230. The user can nonetheless move the blade 230 and blade holder between various extended positions based on the desired use of the knife 10 (e.g., keeping the blade just slightly exposed to limit the blade's cutting depth; keeping the blade 230 fully extended for general purpose use).

According to various embodiments, at least ¼", ½", ¾", 1", or 1¼" of a linear cutting edge 230*a* (see FIG. 12) of the trapezoidal blade 230 may extend out of the neck 30 while the neck 30 and handle base 40 are in their closed position. Similarly, according to various embodiments, at least at least 10%, 20%, 25%, or 30% of the cutting edge 230*a* may extend out of the neck 30 while the neck 30 and handle base 40 are in their closed position.

Figure 13:
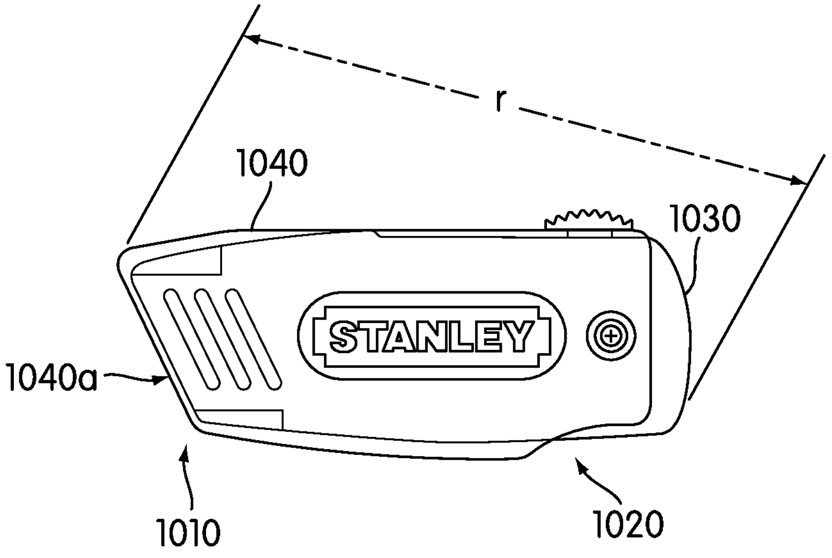
FIG. 13 is a side view of a left side of a knife according to an alternative embodiment of the present invention in a closed position.
Figure 14:
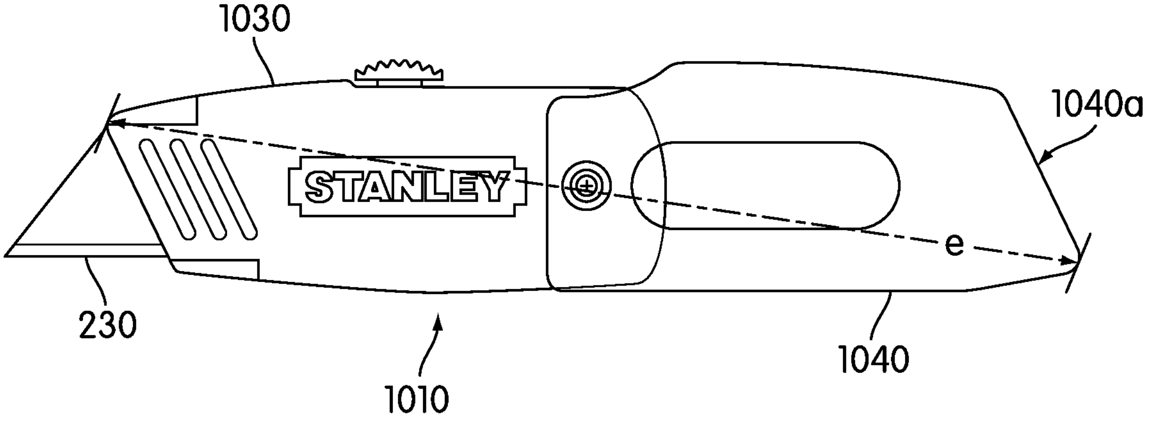
FIG. 14 is a side view of a left side of the knife of FIG. 13 in an open position.

Alternatively, the neck 30 and handle base 40 may be connected to each other and shaped such that the blade 230 and blade holder 200 cannot move into any extended position (e.g., a position in which the cutting edge 230*a* of the blade 230 projects out of the neck 30) when the handle 20 is in the closed position. For example, FIGS. 13 and 14 illustrate an embodiment of a knife 1010, which is generally similar to the knife 10. As shown in FIG. 13, when a neck 1030 and handle base 1040 of a handle 1020 of the knife 1010 are in their closed position, the edge 1040*a* of the handle base 1040 obstructs a path of the blade 230 to prevent the trapezoidal blade 230 from sliding out of the neck 1030 into an extended position and/or to limit the extend of extension of the blade 230. While such an embodiment requires the user to fully retract the blade 230 and blade holder 200 before closing the handle 20, this embodiment may result in a shorter closed length for the knife 1010, thereby making the knife 1010 more compact and versatile. As shown in FIGS. 13 and 14, in some embodiments a contour of the surface of the neck matches a contour of the edge of the handle base. For example, as shown in FIG. 13, the edge 1040*a* of the handle base 1040 matches a contour of the surface of the neck having the aperture from which the blade 230 extends (e.g., aperture 205, as described with reference to FIG. 6).

Figure 15:
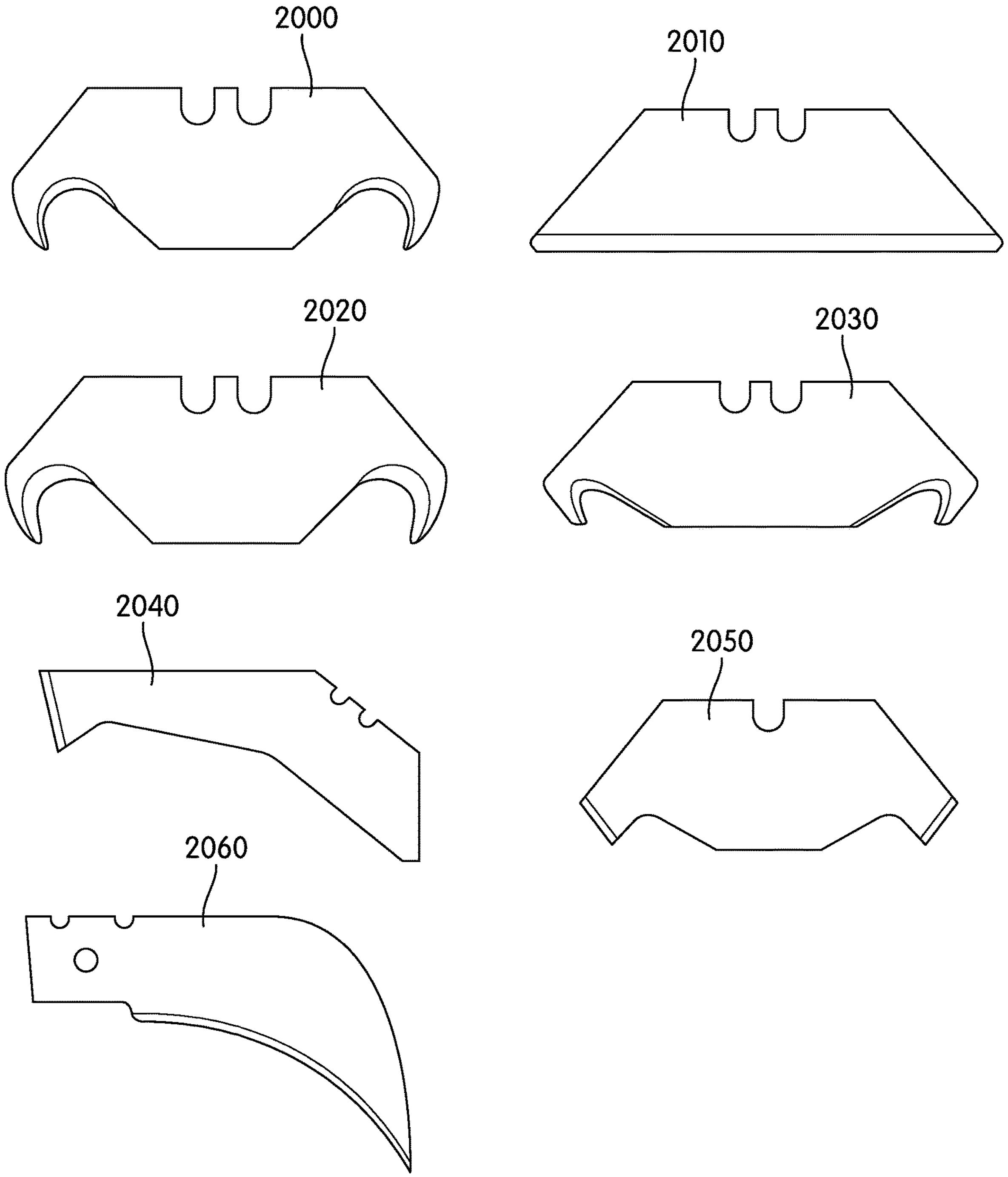
FIG. 15 PRIOR ART
FIG. 15 includes side views of various utility blades that may be used with the knives according to various embodiments of the present invention.

While the illustrated blade 230 comprises a trapezoidal utility blade, a variety of other utility blades may be used with the knives 10, 1010 without deviating from the scope of the present invention. According to one or more embodiments of the present invention, the blade may comprise a blade having parallel upper and lower edges, at least one notch in the upper edge, and a cutting edge. The blade may be the trapezoidal blade 230 illustrated, or any other type of utility blade having structure that can be locked to the blade holder 200 and knife 10 in a manner similar to that described above with respect to the blade 230. FIG. 15 illustrates various examples of utility blades 2000, 2010, 2020, 2030, 2040, 2050, 2060 that may be used in connection with the knives 10, 1010 without deviating from the scope of the present invention. The use of the blades 2040, 2060 may prevent the blade holder 200 from moving into its fully retracted position and may prevent the handle 20 from fully closing according to various embodiments of the present invention. However, the neck 30 and handle 40 may be sized to as to accommodate such blades in the fully retracted blade holder position and the closed handle position. The illustrated standard trapezoidal blades 230, 2010 are about 2⅜ inches long and about ¾ of an inch high.

Figure 3:
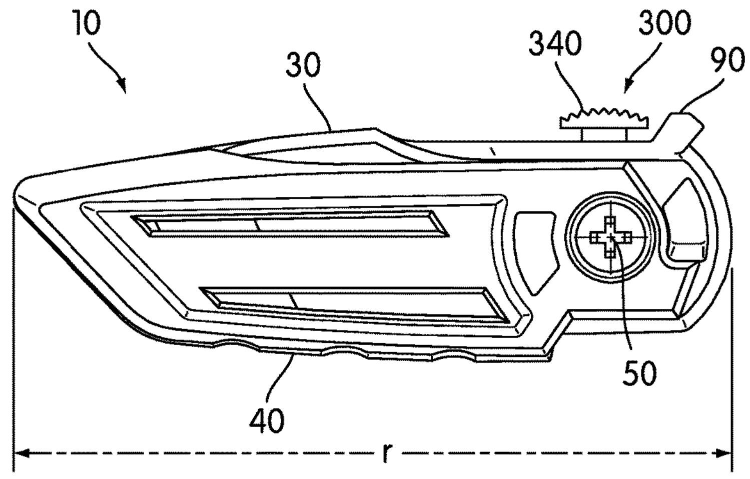
FIG. 3 is a side view of a left side of the knife of FIG. 1 in the closed position.
Figure 4:
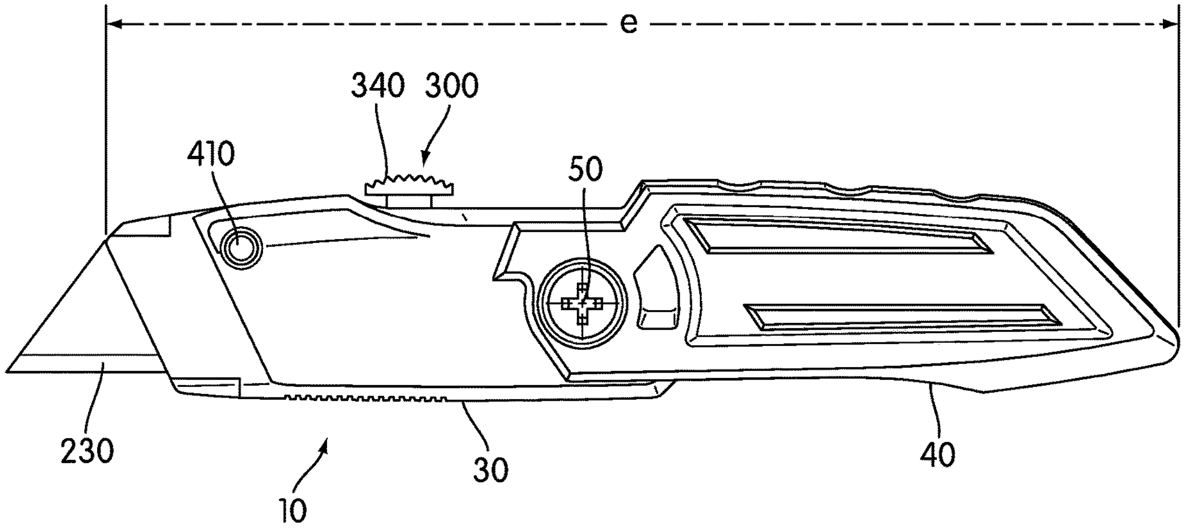
FIG. 4 is a side view of a left side of the knife of FIG. 1 in the open position.
Figure 5:
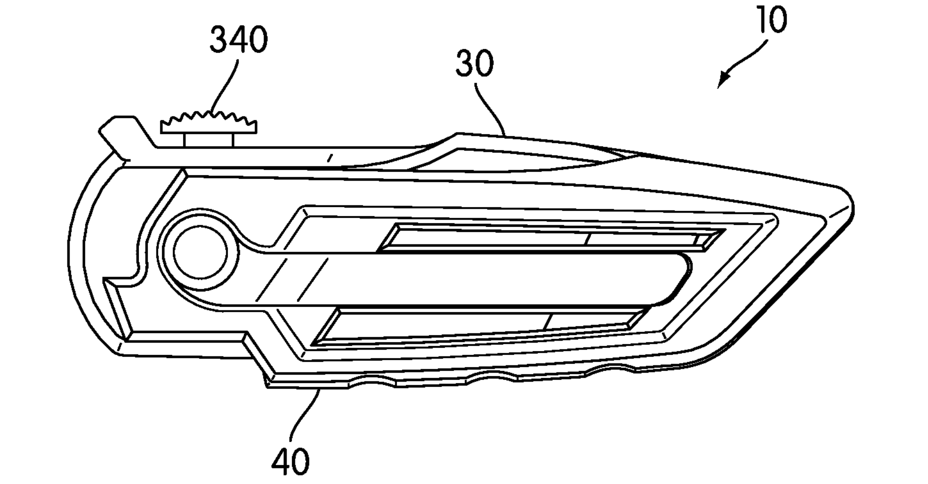
FIG. 5 is a side view of a right side of the knife of FIG. 1 in the closed position.

The combined use of a pivotally-folding handle 20 and a sliding blade holder 200 may result in a compact, versatile knife. As shown in FIGS. 4 and 14, an overall extended length e of the knives 10, 1010 is defined as the largest distance between any two points on the knives 10, 1010 (not including any blade) when the handle 20, 1020 is in its open position. The distance may be along a diagonal (e.g., skewing into the page as shown in FIGS. 4 and 14). As shown in FIGS. 3 and 13, an overall retracted length r of the knives 10, 1010 is defined when the handle 20, 1020 is in its closed position. According to various embodiments of the invention, the length e may be between 3.5 and 8 inches, between 4 and 6.5 inches, between 4.5 and 6 inches, and/or about 5.75 inches. According to various embodiments, the length e may be greater than 3.5, 4, 4.5, 5, 5.5, and/or 6 inches. According to various embodiments, the length r may be less than 5.5, 5, 4.5, 4.25, 4, 3.75, 3.5, 3.25, and or 3 inches. The length r may be between 2.5 and 5 inches and/or between 2.5 and 4.5 inches. In various embodiments, the length r is about 3 or 4.25 inches.

The length e may be at least 15% larger than the length r (i.e., a ratio e:r is at least 1.15:1). According to various embodiments, the length e may be at least 15%, 20%, 25%, 30%, 35%, 40%, 45%, 50%, 55%, 60%, 65%, or 70% larger than the length r. In two embodiments, the length e is about 70% and 50% larger, respectively, than the length r. Accordingly, moving the handle 20, 1020 into its open position makes the handle 20, 1020 substantially longer, which may make the handle 20, 1020 more comfortable for a user by providing a longitudinally longer support surface for the user's hand when using the knives 10, 1010. Conversely, moving the handle 20, 1020 into its closed position makes the handle 20, 1020 substantially smaller, making the knives 10, 1010 easy to store/carry.

As shown in FIGS. 4 and 14, when the handle 20, 1020 is open and the blade 230 is extended, the cutting edge of the blade 230 and the opening of the channel 40*b* in the handle base 40 both face downwardly.

A blade storage compartment for spare blades 230 may be included in the knife without deviating from the scope of the present invention. According to one or more embodiments of the invention, opening and closing of the handle 20 does not provide access to such a blade storage compartment.

In the illustrated embodiments, the knives 10, 1010 utilize resilient members in the form of various springs 180, 320, 430. According to various embodiments of the present invention, such springs may be replaced with any other type of suitable biasing mechanism (e.g., another type of resilient member such as a rubber band, magnets, etc.).

Figure 16:
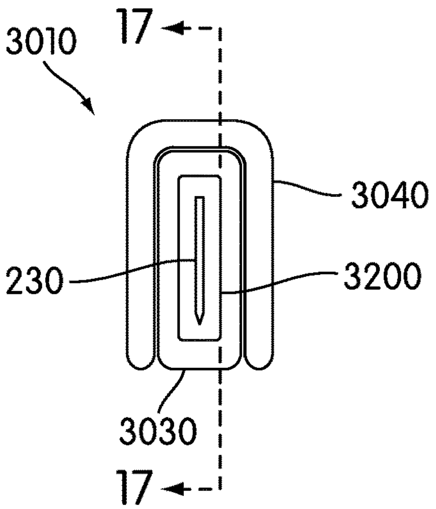
FIG. 16 is a front view of a knife according to an alternative embodiment of the present invention.
Figure 17:
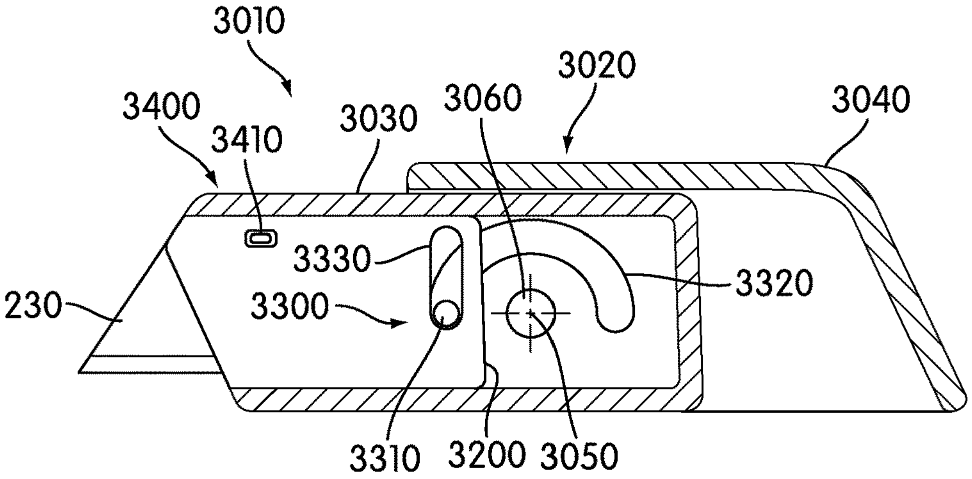
FIG. 17 is a cross-sectional side view of the knife in FIG. 16, taken along the line 17-17 in FIG. 16, while the knife is in an open position.
Figure 18:
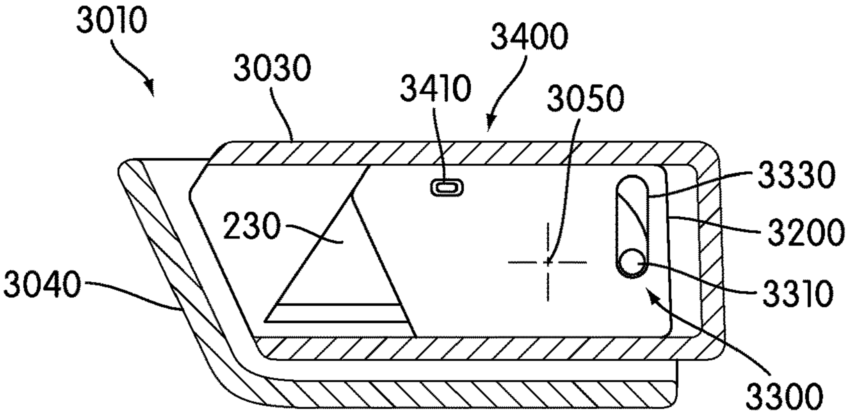
FIG. 18 is a cross-sectional side view of the knife in FIG. 16 while the knife is in a closed position.

FIGS. 16-18 illustrate a knife 3010 according to an alternative embodiment of the present invention that is generally similar to the knives 10, 1010. In the knives 10, 1010, the handle 20, 1020 may be moved between its closed and open positions independently of movement of the blade 230 and sliding blade holder 200 between their retracted and extended positions (except to the extent that extension of the blade 230 might interfere with closing of the handle 20, 1020 according to one or more embodiments (e.g., the embodiment illustrated in FIG. 13)). In contrast, the knife 3010 synchronizes opening and closing of its handle 3020 with the extension and retraction of its blade 230 and blade holder 3200.

As shown in FIGS. 17-18, the handle 3020 of the knife 3010 comprises a neck 3030 and a handle base 3040 that are pivotally connected to each other for relative pivotal movement about an axis 3050 via a pin 3060 (or bolt or other suitable pivot mechanism) between an open position (shown in FIG. 17) and a closed position (shown in FIG. 18).

As shown in FIGS. 17-18, the blade holder 3200 is slidably/telescopically carried by the neck 3030 for movement relative to the neck 3030 between a retracted position (shown in FIG. 18) and an extended position (shown in FIG. 17). A blade 230 is removably fixed to the blade holder 3200 in the same manner as the above-described embodiments, or in any other manner that permits easy removal and replacement of the blade 230. When the blade holder 3200 is in the retracted position, the blade 230 is in a stored position in which its cutting edge is not exposed and is protected by the handle 3020, the handle base 3040, and/or the neck 3030.

A blade-lock quick-release 3400 is similar to the above-discussed blade-lock quick-release 410 and includes a quick release button 3410 similar to the above-discussed button 410. The button 3410 may be accessible through or extend through a slot in a side of the neck 3030 to provide access to the button 3410 when the handle 3020 is in its open position.

As shown in FIGS. 17-18, the knife 3010 includes a retraction/closing synchronization mechanism 3300 that synchronizes opening/closing of the handle 3020 with extension/retraction of the blade holder 3200. Specifically, movement of the handle 3020 from its closed position to its open position causes the blade holder 3200 to move from its retracted position to its extended position. Conversely, movement of the handle 3020 from its open position to its closed position causes the blade holder 3200 to move from its extended position to its retracted position. In the illustrated embodiment, the retraction/closing synchronization mechanism 3300 comprises a pin 3310 mounted to the handle base 3040 for movement with the handle base 3040 relative to the neck 3030. Depending on the configuration of the handle 3020, a slot 3320 (which may be arcuate in form) may be formed in the neck 3030 to prevent the pin 3310 from interfering with opening and closing of the handle 3020. The pin 3310 extends into a slot 3330 in the blade holder 3200. The slot 3330 and pin 3310 are positioned and sized such that the pin 3310 forces the blade holder 3200 between its extended and retracted positions as the handle 3020 moves between its open and closed positions.

While the illustrated retraction/closing synchronization mechanism 3300 relies on a pin attached to the handle base 3040 and a slot 3330 in the blade holder 3200, a pin could alternatively be attached to the blade holder 3200 and a slot (e.g., a spiral shaped slot) formed in the handle base 3040. Moreover, any other suitable mechanism for synchronizing opening/closing of the handle 3020 to extending/retracting of the blade holder 3200 and blade 230 could alternatively be used without deviating from the scope of the present invention (e.g., a gear system that converts pivotal movement of the handle base 3040 into sliding/telescopic movement of the blade holder 3200; a rack and pinion system in which a rack attached to the blade holder 3200 engages a pinion gear (or half gear) that pivots with the handle base 3040 relative to the neck 3030 and blade holder 3200). Use of such a retraction/closing synchronization mechanism 3300 according to one or more embodiments of the present invention may allow the knife to be closed in a single, simple motion by closing the handle (as opposed to other embodiments in which the knife is closed by first retracting the blade/blade holder, and then closing the knife handle).

In the illustrated embodiment, the retraction/closing synchronization mechanism 3300 creates a direct mechanical connection between the opening/closing of the handle 3020 and the extension/retraction of the blade holder 3200. Thus, opening of the handle 3020 necessarily forces the blade holder 3200 into its extended position, and maintaining the handle 3020 in its open position physically and directly forces the blade holder 3200 to remain in its extended position. In other words, the handle 3020 cannot be moved into its open position without moving the blade holder 3200 into its extended position and vice versa. Conversely, the blade holder cannot be moved from its extended position to its retracted position without simultaneously moving the handle 3020 from its open position to its closed position, and vice versa. This positive, direct mechanical connection may help to ensure that the retraction/closing synchronization mechanism 3300 consistently and reliably functions. However, such a positive, direct mechanical connection may be omitted according to various embodiments without deviating from the scope of the present invention.

A retraction/closing synchronization mechanism may be incorporated into the knives 10, 1010 without deviating from the scope of the present invention. Conversely, any one or more features of the knives 10, 1010 may be incorporated into the knife 3010 without deviating from the scope of the present invention.

The foregoing illustrated embodiments are provided to illustrate the structural and functional principles of the present invention and are not intended to be limiting. To the contrary, the principles of the present invention are intended to encompass any and all changes, alterations and/or substitutions within the spirit of the invention.

What is claimed is:

1. A knife comprising:

a handle base;

a neck pivotally connected to the handle base for movement relative to the handle base between a closed position and an open position, wherein the knife is more compact when the neck is in the closed position than when the neck is in the open position;

a utility blade holder slidingly carried by the neck for sliding movement relative to the neck between a retracted position and an extended position;

a blade holder lock that selectively locks the blade holder in at least the extended position, a partially extended position, and the retracted position; and a utility blade carried by the blade holder such that movement of the utility blade holder between its extended, partially extended, and retracted positions moves the utility blade between an exposed position in which at least a portion of a cutting edge of the blade is exposed when the utility blade holder is in the partially extended or extended positions, and a protected position in which the cutting edge of the blade is protected by the neck when the utility blade holder is in the retracted position;

wherein the neck's open position comprises a position in which the neck and handle base together define a longitudinally extended handle that is shaped and configured for a user to grip the knife during use while the neck is in the open position;

wherein a combined length of the handle base and neck when the neck is in the open position is longer than a combined length of the handle base and neck when the neck is in the closed position; and wherein the utility blade substantially has the shape of an isosceles trapezoid, the cutting edge being disposed on a longest edge of the trapezoid;

wherein a surface of the neck defines an aperture from which the utility blade extends or partially extends from the neck;

wherein an edge of the handle base obstructs a path of the utility blade to prevent movement of the utility blade holder into the extended position when the neck is in the closed position; and wherein a contour of the surface of the neck matches a contour of the edge of the handle base.

2. The knife of claim 1, wherein the combined length of the handle base and neck when the neck is in the open position is at least 40% longer when the neck is in the open position than in the closed position.

3. The knife of claim 1, wherein the combined length of the handle base and neck when the neck is in the closed position is less than 4.5 inches.

4. The knife of claim 1, wherein when the neck is in the closed position, the handle base limits an extent to which the blade can move out of the blade's protected position.

5. The knife of claim 1, wherein when the neck is in the closed position, the handle base encloses the blade regardless of whether the blade is in the exposed or protected position relative to the neck.

6. The knife of claim 1, wherein:

the combined length of the handle base and neck when the neck is in the closed position is less than 4.5 inches, and the combined length of the handle base and neck when the neck is in the open position is greater than 5 inches.

7. The knife of claim 1, wherein the combined length of the handle base and neck when the neck is in the open position is at least 50% longer than the combined length of the handle base and neck when the neck is in the closed position.

8. The knife of claim 1, wherein the combined length of the handle base and neck when the neck is in the open position is at least 60% longer than the combined length of the handle base and neck when the neck is in the closed position.

9. The knife of claim 1, further comprising a blade release actuator, wherein the blade release actuator, when actuated, permits disengagement of the utility blade from the blade holder when the blade holder is in the extended position.

10. The knife of claim 9, wherein the blade release actuator is spring biased out of the neck.

11. The knife of claim 10, wherein the blade release actuator extends outwardly from the neck through a hole in a side of the neck.

12. The knife of claim 1, further comprising a neck lock that locks the neck in the open position relative to the handle base when the neck is pivoted into the open position.

13. The knife of claim 12, wherein the neck lock further locks the neck in the closed position relative to the handle base when the neck is pivoted into the closed position.

14. A knife comprising:

a handle base;

a neck pivotally connected to the handle base for movement relative to the handle base between a closed position and an open position, wherein the knife is more compact when the neck is in the closed position than when the neck is in the open position;

a utility blade holder slidingly carried by the neck for sliding movement relative to the neck between a retracted position and an extended position, the utility blade holder configured to hold a blade and selectively extend the blade from the neck;

a blade holder lock that selectively locks the utility blade holder in at least the extended position, a partially extended position, and the retracted position;

wherein an edge of the handle base obstructs a path of the blade to prevent movement of the utility blade holder into the extended position when the neck is in the closed position;

wherein a surface of the neck defines an aperture from which the blade extends or partially extends from the neck; and wherein a contour of the surface of the neck matches a contour of the edge of the handle base.

15. The knife of claim 14, wherein the blade substantially has the shape of an isosceles trapezoid, a cutting edge being disposed on a longest edge of the trapezoid.

16. The knife of claim 15, wherein a mounting notch engaged by the utility blade holder is formed in a first linear edge and wherein the cutting edge is opposite the first linear edge.

* * * * *